United States Patent Office 2,927,119
Patented Mar. 1, 1960

2,927,119

6β:17β - DIHYDROXY - 17α - ALKYNYL - 3:5 - CYCLOANDROSTANES AND METHOD FOR THE PREPARATION OF 17β-HYDROXY-17α-ALKYNYL STEROIDS OF THE ANDROSTANE AND 3:5-CYCLOANDROSTANE SERIES

Bernard Ellis, Vladimir Petrow, Martin Stansfield, and Isobel Ann Stuart-Webb, all of London, England, assignors to The British Drug Houses Limited, London, England, a British company No Drawing. Application May 15, 1958
Serial No. 735,366

Claims priority, application Great Britain May 21, 1957

7 Claims. (Cl. 260—397.5)

This invention is for improvements in or relating to organic compounds and has particular reference to the preparation of steroidal derivatives having a 17β-hydroxyl and a 17α-alkynyl group.

It is an object of the invention to provide a new process for the preparation of 17β-hydroxy-17α-alkynyl derivatives of substituted perhydrocyclopentenophenanthrene, which process can be applied to the preparation of 17β-hydroxy-17α-alkynyl derivatives of both saturated and unsaturated steroids of the androstane and 3:5-cycloandrostane classes, substituted in Rings A and B, by not less than one of the groups OH, OAlkyl, or O.

It is a further object of the invention to provide 17α-alkynyl derivatives of 17β-hydroxy-perhydrocyclopentenophenanthrene and these are of value on account of their biological properties or as intermediates in the preparation of compounds with useful biological properties. Thus, for example, the invention provides compounds which are, or which may be converted into the progestationally-active homologues of ethisterone and 6α-methylethisterone.

The invention provides new 17β-hydroxy-17α-alkynyl steroids of the androstane and 3:5-cycloandrostane classes having the general formula

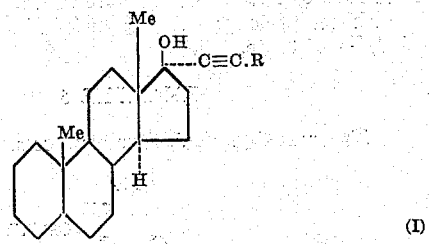

(I)

where R is an alkyl group containing not more than four carbon atoms.

The invention also provides the specific new compounds

17α-(prop-1-ynyl)-androst-5-en-3β:17β-diol
17α-(but-1-ynyl)-androst-5-en-3β:17β-diol
17α-(pent-1-ynyl)-androst-5-en-3β:17β-diol
17α-(prop-1-ynyl)-3:5-cycloandrostan-6β:17β-diol
17α-(but-1-ynyl)-3:5-cycloandrostan-6β:17β-diol
17α-(pent-1-ynyl)-3:5-cycloandrostan-6β:17β-diol The above compounds are valuable intermediates in the preparation of 21-methyl, 21-ethyl and 21-propyl-ethisterone which have valuable progestational properties when administered by the oral route. 6α-methyl-17α-(prop-1-ynyl)-androst-5-ene-3β:17β-diol, which is a valuable intermediate in the preparation of 6α:21-dimethyl ethisterone, which is a potent orally-active progestational agent.

According to the present invention there is provided a method for the preparation of 17β-hydroxy-17α-alkynyl steroids of the androstane and 3:5-cycloandrostane classes having the general formula

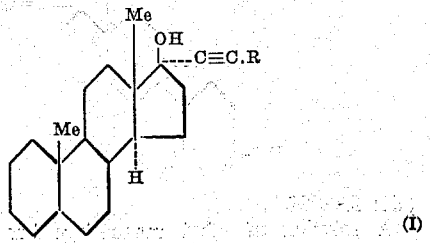

(I)

where R is an alkyl group containing not more than four carbon atoms, which method comprises reacting a substituted 17-oxo-steroid having the general formula

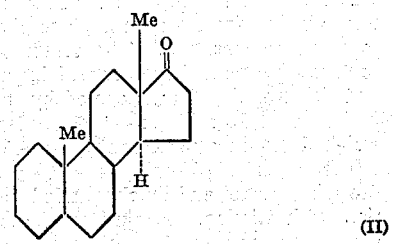

(II)

with the appropriate alkynyl magnesium halide and subsequently regenerating the desired steroid from the complex so formed.

The conversion of the substituted 17-oxo-steroid (II) into the corresponding 17α-alkynyl steroid (I) may conveniently be effected by adding a solution of the compound of type (II) in a solvent, such as tetrahydrofuran, to an excess of the alkynyl magnesium halide, preferably the bromide or iodide, in a solvent such for example as tetrahydrofuran, and refluxing the mixture or allowing the mixture to stand at room temperature for several hours. Thereafter, the resulting complex may be decomposed by the addition of, for example, aqueous ammonium chloride, and the steroidal derivative isolated by conventional methods such as extraction with an organic solvent such for example as ether.

The process of the invention may be applied to 17-oxo-steroids of the androstane and 3:5-cycloandrostane series containing a variety of substituents and unsaturated linkages in the molecule as will be apparent to those skilled in the art.

Hydroxyl or acyloxy groups will not, in general, interfere with the process of the invention.

Isolated or conjugated unsaturated linkages which may be present in rings A, B and C, and which are not conjugated with an oxygen containing group do not, in general, interfere with the process of the invention.

Alkyl or alkoxy groups situated in any position (other than at $C_{17}$) likewise will not interfere with the process of the invention.

Oxo-groups and in particular those at $C_3$, $C_6$ and $C_{12}$ (but excluding $C_{17}$), however, will in general require protection in order that their participation in the Grignard reaction may be avoided. Such protection may readily be achieved by, for example, ketal or enol ether formation, thereby permitting subsequent regeneration of the oxo-function. In particular, the process of the invention may be applied to the following structures:

3β-hydroxy(acyloxy)-androst-5-en-17-one
6β-hydroxy-3:5-cycloandrostan-17-one
the 3-enol ether- and 3-ketal-derivatives of androst-4-ene-3:17-dione, and of 11-oxygenated androst-4-ene-3:17-diones Following is a description by way of example of methods of carrying the invention into effect:

EXAMPLE 1

*17α-(prop-1-ynyl)-androst-5-en-3β:17β-diol*

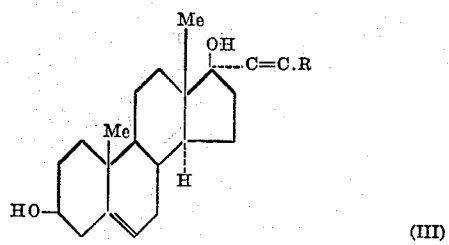

(III; R=CH₃).

A solution of ethyl magnesium bromide was prepared under nitrogen in a 3-necked flask fitted with a dropping funnel, stirrer and reflux condenser from magnesium (3.65 g.), ethyl bromide (16.3 g.) and anhydrous tetrahydrofuran (150 ml.). The solution was heated under reflux for 30 minutes, and then allowed to cool to room temperature. The reflux condenser was then replaced by a condenser cooled by acetone/ solid $CO_2$, and the dropping funnel cooled by the addition of tetrahydrofuran (20 ml.) at −60° C. 1-propyne (8 g.) was weighed out in a flask cooled to −60° C., dissolved in tetrahydrofuran (60 ml.) at −60° C., transferred to the dropping funnel and quickly added to the Grignard solution with stirring. Evolution of ethane occurred, and stirring was continued for 30 minutes, by which time evolution of ethane had ceased. The reflux condenser was then returned to the flask and a solution of dehydroisoandrosterone (4.3 g.) in tetrahydrofuran (100 ml.) added dropwise with stirring. A gelatinous precipitate was formed, and the mixture was stirred under reflux for 2 hours. The complex was decomposed with ammonium chloride (50 g.) in water (200 ml.) and the product isolated with ether. Removal of the solvent under reduced pressure gave a solid residue which crystallised from acetone/hexane as colourless plates M.P. 176 to 180° C. Recrystallisation from aqueous methanol gave the monohydrate of 17α-(prop-1-ynyl)-androst-5-en-3β:17β-diol as plates M.P. 179 to 181° C., $[\alpha]_D^{21}$ −121° (c. 0.98) (in chloroform throughout unless otherwise stated).

EXAMPLE 2

*17α-(but-1-ynyl)-androst-5-en-3β:17β-diol (III; R=C₂H₅)*

A solution of ethyl magnesium bromide was prepared under nitrogen in a 3-necked flask fitted with a dropping funnel, stirrer and reflux condenser from magnesium (4.86 g.), ethyl bromide (21.8 g.) and anhydrous tetrahydrofuran (200 ml.). The solution was heated under reflux for 30 minutes, and then allowed to cool to room temperature. The reflux condenser was replaced by a condenser cooled with acetone/solid $CO_2$, and the dropping funnel cooled by addition of tetrahydrofuran (50 ml.) cooled to −60° C. 1-butyne (12 g.) was weighed out in a flask cooled to −60° C., dissolved in tetrahydrofuran (50 ml.) at −60° C. and quickly added with stirring to the Grignard solution. Ethane was evolved, and stirring was continued for 30 minutes. The reflux condenser was returned to the flask and a solution of dehydroisoandrosterone (5.8 g.) in tetrahydrofuran (100 ml.) added dropwise with stirring. A gelatinous precipitate was formed, and the mixture was heated under reflux for 2 hours. The complex was decomposed with ammonium chloride (50 g.) in water (200 ml.) and the product isolated with ether. Removal of the solvent under reduced pressure gave a gum which crystallised on addition of hexane. Recrystallisation from acetone/hexane gave 17α(ut-1-ynyl)-androst-5-en-3β:17β-diol as needles, M.P. 78 to 81° C., $[\alpha]_D^{24}$ −121° (c. 0.83).

EXAMPLE 3

*17α-(pent-1-ynyl)-androst-5-en-3β:17β-diol (III; R=n—C₃H₇)*

A solution of ethyl magnesium bromide was prepared in a nitrogen atmosphere from magnesium (4.86 g.), ethyl bromide (21.8 g.) and anhydrous tetrahydrofuran (200 ml.). The solution was heated under reflux for 30 minutes, and then allowed to cool to room temperature. 1-pentyne (15 g.) in tetrahydrofuran (20 ml.) was slowly added to the solution with stirring. Ethane was evolved, and stirring was continued for a further 30 minutes. A solution of dehydroisoandrosterone (5.8 g.) in tetrahydrofuran (100 ml.) was then added dropwise with stirring, with formation of a gelatinous precipitate. The mixture was stirred for 5 hours at room temperature and then allowed to stand overnight at room temperature. Decomposition with ammonium chloride (50 g.) in water (200 ml.) and isolation of the product with ether gave a gum which crystallised on addition of hexane. Recrystallisation from acetone/hexane gave 17α-(pent-1-ynyl)-androst-5-en-3β:17β-diol as needles M.P. 67 to 69° C. $[\alpha]_D^{23}$ −120° (c. 0.97).

EXAMPLE 4

*17α-(hex-1-ynyl)-androst-5-en-3β:17β-diol (III; R=n—C₄H₉)*

A solution of ethyl magnesium bromide was prepared under nitrogen from magnesium (4.86 g.), ethyl bromide (21.8 g.) and anhydrous tetrahydrofuran (200 ml.). The solution was heated under reflux for 30 minutes and then allowed to cool to room temperature. 1-hexyne (18 g.) in tetrahydrofuran (20 ml.) was slowly added to the solution with stirring. Ethane was evolved, and stirring was continued for 30 minutes. A solution of dehydroisoandrosterone (5.8 g.) in tetrahydrofuran (100 ml.) was then added dropwise with stirring, with formation of a gelatinous precipitate. The mixture was heated under reflux for 2 hours. The complex was decomposed with ammonium chloride (50 g.) in water (200 ml.) and the product isolated with ether. Removal of the solvent under reduced pressure gave a gum which crystallised from acetone/hexane as needles M.P. 80 to 82° C. Recrystallisation from acetone/hexane gave 17α-(hex-1-ynyl)-androst-5-en-3β:17β-diol as needles, M.P. 80 to 82° C., which on prolonged drying had M.P. 70 to 72° C., $[\alpha]_D^{22}$ −114° (c. 1.00).

EXAMPLE 5

*17α-(prop-1-ynyl)-3:5-cycloandrostan-6β:17β-diol*

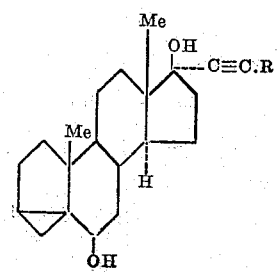

(IV; R=CH₃).

A solution of ethyl magnesium bromide was prepared under nitrogen in a 3-necked flask fitted with a dropping funnel, stirrer and reflux condenser from magnesium (3.65 g.), ethyl bromide (16.3 g.) and anhydrous tetrahydrofuran (150 ml.). The solution was heated under reflux for 30 minutes and then allowed to cool to room temperature. The reflux condenser was replaced by a condenser cooled with acetone/solid $CO_2$, and the dropping funnel was cooled by addition of tetrahydrofuran (50 ml.) at −60° C. 1-propyne (8 g.) was weighed out in a flask cooled to −60° C., dissolved in tetrahydrofuran (50 ml.) at −60° C., transferred to the dropping funnel and quickly added to the Grignard solution with stirring. Ethane was evolved and the solution was stirred for 30 minutes. The reflux condenser was then returned to the flask and a solution of 6β-hydroxy-3:5-cycloandrostan-17-one (4.3 g.) in tetrahydrofuran (100 ml.) added dropwise with stirring. The solution was then heated under reflux for 2 hours. The complex was decomposed with ammonium chloride (50 g.) in water (200 ml.) and the product isolated with ether. Removal of the solvent under reduced pressure gave a gum which crystallised on addition of hexane. Recrystallisation from acetone/hexane gave 17α-prop-1-ynyl-3:5-cycloandrostan-6β:17β-diol as needles, M.P. 199 to 201° C., $[\alpha]_D^{21}$ −12° (c. 1.03).

EXAMPLE 6

*17α-(but-1-ynyl)-3:5-cycloandrostan-6β:17β-diol*
*(IV; R=C₂H₅)*

A solution of ethyl magnesium bromide was prepared under nitrogen in a 3-necked flask fitted with a dropping funnel, stirrer and reflux condenser from magnesium (3.65 g.), ethyl bromide (16.3 g.) and anhydrous tetrahydrofuran (150 ml.). The solution was heated under reflux for 30 minutes, and then allowed to cool to room temperature. The reflux condenser was replaced by a condenser cooled with acetone/solid $CO_2$, and the dropping funnel was cooled by the addition of tetrahydrofuran (50 ml.) at −60° C. 1-butyne (9.2 g.) was weighed out in a flask cooled to −60° C., dissolved in tetrahydrofuran (50 ml.) at −60° C., transferred to the dropping funnel and quickly added to the Grignard solution with stirring. Ethane was evolved, and stirring was continued for 30 minutes. The reflux condenser was returned to the flask and a solution of 6β-hydroxy-3:5-cycloandrostan-17-one (4.3 g.) in tetrahydrofuran (100 ml.) added dropwise with stirring. The solution was stirred under reflux for 2 hours. Decomposition of the complex with ammonium chloride (50 g.) in water (200 ml.) and isolation of the product with ether gave a gum which crystallised from acetone/hexane as prisms M.P. 166 to 169° C. Recrystallisation from aqueous methanol gave 17α-(but-1-ynyl)-3:5-cycloandrostan-6β:17β-diol as blades, M.P. 172 to 174° C., $[\alpha]_D^{22}$ −14.5° (c. 0.92).

EXAMPLE 7

*17α-(pent-1-ynyl)-3:5-cycloandrostan-6β:17-diol*
*(IV; R=n—C₃H₇)*

A solution of ethyl magnesium bromide was prepared in a nitrogen atmosphere from magnesium (3.65 g.), ethyl bromide (16.3 g.) and anhydrous tetrahydrofuran (150 ml.). The solution was heated under reflux for 30 minutes, and then allowed to cool to room temperature. 1-pentyne (13.6 g.) in tetrahydrofuran (50 ml.) was added slowly with stirring. Ethane was evolved, and stirring was continued for 30 minutes. 6β-hydroxy-3:5-cycloandrostan-17-one (4.3 g.) in tetrahydrofuran (100 ml.) was then added dropwise with stirring, and the solution heated under reflux for 2 hours. The complex was decomposed with ammonium chloride (50 g.) in water (200 ml.) and the product was isolated with ether. Removal of the solvent under reduced pressure gave a gum. Percolation of a benzene solution through a short column of alumina (10 g.) and removal of the solvent gave a residue which crystallised from benzene/light petroleum (B.P. 60/80) as clusters of needles M.P. 140 to 144° C. Recrystallisation from aqueous methanol gave 17α-(pent-1-ynyl)-3:5-cycloandrostan-6β:17β-diol as blades, M.P. 146 to 148° C., $[\alpha]_D^{22}$ −13° (c. 1.04).

EXAMPLE 8

*6-methyl-17α-(prop-1-ynyl)-androst-5-ene-3β:17β-diol*
*(VI; R=Me)*

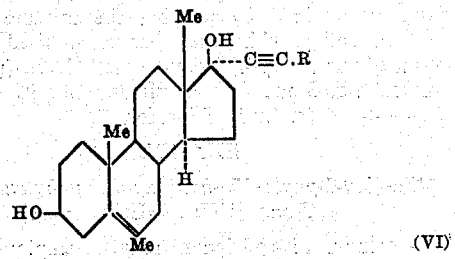

The procedure described in Example 1 was employed, and 6-methyldehydroisoandrosterone acetate used in place of dehydroisoandrosterone. 6-methyldehydroisoandrosterone acetate may be prepared by the method disclosed in the Journal of the Chemical Society (British), September 1957, pages 4105–4111. The product was isolated with ether in the usual way and purified from acetone/hexane. 6-methyl-17α-(prop-1-ynyl)-androst-5-ene-3β:17β-diol formed needles, M.P. 115° C., $[\alpha]_D^{24}$ −105° (c. 0.5).

EXAMPLE 9

*17β-hydroxy-17α-(prop-1-ynyl)-androst-4-en-3-one*
*(VII, R=Me, R'=H)*

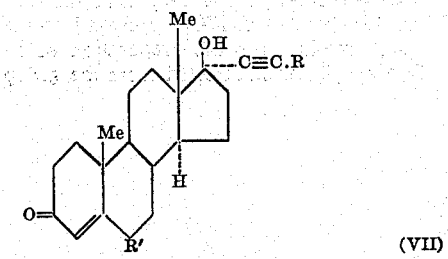

(a) A solution of a Grignard reagent, employing 1-propyne (8 g.), was prepared by the method described in Example 1. To this reagent there was added the 3-enol ethyl ether (4 g.) derived from androst-4-ene-3:17-dione in tetrahydrofuran (100 ml.), and the mixture heated under reflux for 2 hours. The complex was decomposed with ammonium chloride (50 g.) water in water (200 ml.) and the product isolated with ether. Its solution in ethanol (100 ml.) was treated with concentrated hydrochloric acid (5 ml.) for 2 hours at room temperature, and the product isolated with ether and crystallised from acetone/hexane. 17β-hydroxy-17α-(prop-1-ynyl)androst-4-en-3-one formed needles, M.P. 151 to 152° C., $[\alpha]_D^{25}$ +11° (c. 0.53 in ethanol).

(b) A solution of a Grignard reagent, employing 1-propyne (4 g.) was prepared by the method described in Example 1. To this reagent there was added the 3:3-ethylenedioxy derivative (2 g.) of androst-4-ene-3:17-dione in tetrahydrofuran (50 ml.), and the mixture heated under reflux for 2 hours. The cooled mixture was treated with ammonium chloride (25 g.) in water (100 ml.), the product isolated with ether, and treated with 95% acetic acid (25 ml.) for 18 hours at room temperature. Isolation of the product with ether followed by purification from acetone/hexane gave 17β-hydroxy-17α-(prop-1-ynyl)-androst-4-en-3-one, M.P. 151° C., identical with a sample prepared by method (a) above.

EXAMPLE 10

*17β-hydroxy-6α-methyl-17α-(prop-1-ynyl)androst-4-en-3-one (VII; R and R'=Me)*

A solution of a Grignard reagent, employing 1-propyne (8 g.) was prepared by the method described in Example 1. To this reagent there was added the 3:3-ethylenedioxy derivative (4 g.) of 6α-methylandrost-4-ene-3:17-dione in tetrahydrofuran (100 ml.), and the mixture heated under reflux for 3 hours. After decomposition of the complex with aqueous ammonium chloride, the product was isolated with ether and treated with 90% acetic acid (50 ml.) for 30 minutes at 100° C. The product obtained by pouring the mixture into water and extracting with ether was crystallised from aqueous methanol. 17β-hydroxy-6α-methyl-17α-(prop-1-ynyl) androst-4-en-3-one formed plates M.P. 99 to 102° C., $[\alpha]_D^{20} +10°$ (c. 1.0 in chloroform).

EXAMPLE 11

*17α-(but-1-ynyl)-17β-hydroxy-6α-methylandrost-4-en-3-one (VII; R=Et, R'=Me)*

A solution of a Grignard reagent, employing 1-butyne (12 g.), was prepared by the method described in Example 2. To this reagent there was added the 3:3-ethylenedioxy derivative (6 g.) of 6α-methylandrost-4-ene-3:17-dione in tetrahydrofuran (100 ml.), and the mixture heated under reflux for 2 hours. The product was isolated as described in the preceding example, treated with 90% acetic acid for 30 minutes at 100° C., and the resulting material isolated and purified by crystallisation from aqueous methanol. 17α-(but-1-ynyl)-17β-hydroxy-6α-methylandrost-4-en-3-one separated in blades, M.P. 74 to 76° C., $[\alpha]_D^{22} +17°$ (c. 1.0 in chloroform).

We claim:

1. 17α-(prop-1-ynyl)-3:5-cycloandrostane-6β:17β-diol.
2. 17α-(but-1-ynyl)-3:5-cycloandrostane-6β:17β-diol.
3. 17α-(pent-1-ynyl)-3:5-cycloandrostane-6β:17β-diol.
4. A method for the preparation of a 17β-hydroxy-17α-alkynyl steroid selected from the group consisting of the androstane and 3:5-cycloandrostane series where said 17α-alkynyl group is ---C≡C (lower alkyl), which method comprises reacting a corresponding 17-oxo-steroid with an alkynyl magnesium halide reagent providing an alkynyl group as defined above, to thereby provide a Grignard complex involving said 17-oxo group, and subsequently decomposing said complex to form the said 17β-hydroxy-17α-alkynyl steroid product.
5. A method as claimed in claim 4 wherein a solution of said substituted 17-oxo-steroid in tetrahydrofuran is added to an excess of said alkynyl magnesium halide in tetrahydrofuran.
6. A method as claimed in claim 4 wherein said complex is decomposed by the addition of aqueous ammonium chloride and the product isolated with ether.
7. 6β:17β-dihydroxy-17α-alkynyl steroids of the 3:5-cycloandrostane series wherein said 17α-alkynyl group is ---C≡CR, and where R is an alkyl group containing up to four carbon atoms.

References Cited in the file of this patent

UNITED STATES PATENTS

| | | |
|---|---|---|
| 2,374,370 | Miescher et al. | Apr. 24, 1945 |
| 2,744,122 | Djerassi et al. | May 1, 1956 |
| 2,816,901 | Petrow et al. | Dec. 17, 1957 |
| 2,830,063 | Clinton et al. | Apr. 8, 1958 |
| 2,833,794 | Goldkamp et al. | May 6, 1958 |
| 2,843,609 | Colton | July 15, 1958 |
| 2,863,886 | Mancera et al. | Dec. 9, 1958 |